(12) United States Patent
Pinter et al.

(10) Patent No.: US 7,059,186 B2
(45) Date of Patent: Jun. 13, 2006

(54) INTEGRATED FLOW SENSOR FOR MEASURING A FLUID FLOW

(75) Inventors: Stefan Pinter, Reutlingen (DE); Tjalf Pirk, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/020,720

(22) Filed: Dec. 23, 2004

(65) Prior Publication Data

US 2005/0178195 A1    Aug. 18, 2005

(30) Foreign Application Priority Data

Dec. 23, 2003 (DE) ................................ 103 60 654
Dec. 23, 2003 (DE) ................................ 103 60 665
Feb. 19, 2004 (DE) ........................ 10 2004 008 008

(51) Int. Cl.
*G01F 1/68* (2006.01)

(52) U.S. Cl. .................................................. 73/204.26
(58) Field of Classification Search .............. 73/204.26
See application file for complete search history.

(56) References Cited

U.S. PATENT DOCUMENTS 5,965,813 A * 10/1999 Wan et al. ............... 73/204.26
6,032,689 A *  3/2000 Tsai et al. .................... 137/486
6,655,207 B1* 12/2003 Speldrich et al. .......... 73/202.5

\* cited by examiner

*Primary Examiner*—Harshad Patel
(74) *Attorney, Agent, or Firm*—Kenyon & Kenyon LLP (57) ABSTRACT

An integrated flow sensor for determining a fluid flow is described. It has a first function layer and a second function layer which is applied to the first function layer and is electrically connected thereto, a fluid channel being situated in the function layers to conduct a fluid flow, at least one heating region and at least one measuring region being provided adjacent to the fluid channel, the first function layer being either not covered by the second function layer in the heating region and in the measuring region or being insulated from the above-situated second function layer, the first function layer or the second function layer having an increased resistance at least in the heating region, the flow sensor being connectable in such a way that it conducts a heating current through the first or second function region of the heating region, and/or measures a resistance value of the first or second function layer in the measuring region, and the fluid flow being determinable as a function of the measured resistance value at a constant heat output or as a function of the required heat output at a predefined resistance value.

8 Claims, 6 Drawing Sheets

INTEGRATED FLOW SENSOR FOR MEASURING A FLUID FLOW

FIELD OF THE INVENTION

The present invention relates to an integrated flow sensor for measuring a fluid flow through an integrated component. The present invention furthermore relates to a method for manufacturing such a flow sensor.

BACKGROUND INFORMATION

In microfluidics, in addition to the transport and processing of small amounts of gaseous or fluid substances, it is necessary to determine transported amounts as accurately and interference-free as possible. This is usually accomplished by measuring a fluid flow. However, the small size of the components requires an approach that is different from traditional constructions. In flow sensors that are designed as variants heating wire method, for example, short-circuits or interactions with conductive fluids may occur if insufficient passivation has been applied.

The heating wire method measures the flow of a fluid by heating, in a controlled manner, at one point and measuring the temperature increase of the fluid at a downstream temperature sensor, the flow velocity of the fluid being determinable from the temperature measured at the temperature sensor.

SUMMARY OF THE INVENTION

An object of the present invention is to provide an integrated flow sensor which is manufacturable in a simple manner and has a simple construction. It is furthermore the object of the present invention to provide a method for manufacturing a flow sensor.

According to a first aspect of the present invention, an integrated flow sensor for determining a fluid flow is provided with a first function layer and a second function layer. The second function layer is applied to the first function layer and is electrically connected thereto. A fluid channel is situated in the function layers for conducting a fluid flow. A heating region and one or a plurality of measuring regions are provided next to the fluid channel. The first function layer is either not covered by the second function layer in the heating region and the measuring region or is insulated from the second function layer situated thereon, so that the first function layer or the second function layer is operable as a heating resistor or a measuring resistor. The flow sensor is connectable in such a way that it conducts a heating current through the first or second function layer of the heating region and/or measures a resistance value of the first or second function layer in the measuring region, the fluid flow being determinable as a function of the measured resistance value at constant heating output or as a function of the required heating output at a predefined resistance value.

According to the present invention, it is possible to supply a certain amount of heat to a certain point or to a certain region in the channel wall of the fluid channel and to determine a temperature change in the fluid flow flowing in the fluid channel via a change in resistance at the measuring point or in the measuring region. The heating region and the measuring region are formed in that the circuit formed via the first and the second function layers has a section in which the current is conducted only through the first function layer which has a higher resistance. If a current is conducted through such a circuit, the first function layer heats up because the first function layer has a higher resistance in this region than the remaining circuit and thus the greater part of the voltage drop occurs there. For measuring the change in temperature of the fluid flow, a measuring voltage or a measuring current is applied to a circuit through the measuring region and the change in resistance of the first function layer in the measuring region is measured.

To further increase the voltage drop in the heating region or the measuring region, the first function layer has a higher resistance than the second function layer.

The heating current is preferably conducted via a wall section of the fluid channel located on the side of the heating region. This has the advantage that the current leads for supplying the heating current may be provided in the integrated flow sensor at a distance that is easy to contact from the outside.

The resistance is preferably measurable by measuring a measuring current when a measuring voltage is applied, the measuring current being conducted via a wall section of the fluid channel located on the side of the measuring region.

The first function layer may be applied to a substrate, the first function layer being electrically insulated from the substrate at least in the heating region and/or in the measuring region. This prevents part of the heating current or the measuring current from flowing through the substrate or the fluid in the region of the heating resistor or measuring resistor.

It may also be provided for the first function layer to be applied to a substrate, the first function layer being thermally insulated from the substrate in the heating region. The influence of the substrate temperature on the heat input into the fluid flow may be reduced in this manner since less heat is directed from the heating region to the substrate.

The heating current is preferably applied via a contact surface on the second function layer, and/or a measuring voltage or a measuring current for measuring the measuring resistance is measurable via a contact surface.

The heating region and/or the measuring region is/are preferably formed by a wall section of the fluid channel, the second function layer of the wall section being insulated from the second function layer provided with the contact surface, so that the heating region and/or the measuring region is/are formed by the first function layer of the wall section. In this way, instead of a heating point on the wall of the fluid channel, a wall section is provided for heating the fluid flow. The measuring region may thus be formed by an additional wall section of the fluid channel. The additional wall section is also heated by the fluid flow heated in the heating region, which results in a change in the resistance of the wall section, from which the flow rate of the fluid may be determined.

In order not to cause any electrical interaction between the fluid conducted in the fluid channel and the heating region or the measuring region, the inner wall of the wall section of the fluid channel is preferably provided with an electrical insulation layer.

According to a further aspect of the present invention, a method is provided for manufacturing a flow sensor. For this purpose, a sacrificial layer is applied to a substrate except in the region of the walls of a fluid channel of the flow sensor. A first function layer is then applied onto which an etch stop layer is deposited. The etch stop layer is structured to define a heating region and a measuring region of the flow sensor. A second function layer is then applied to the first function layer onto which contact surfaces are applied for electrically connecting the heating region and the measuring region. The contact surfaces and the channel walls of the fluid channel are then masked in such a way that they are not attacked by a subsequent deep etch step. The deep etch step etches the function layers, exposing the sacrificial layer.

The thus exposed sacrificial layer may be removed by a sacrificial layer etch process, removing the sacrificial layer underneath the first function layer in the heating region and the measuring region, thus creating a clearance for thermal or electrical insulation between the substrate and the first function layer in the heating region and the measuring region.

After structuring the etch stop layer, a further sacrificial layer may be applied to define a wall section in the wall of the fluid channel, which is configured as a heating region or a measuring region. The additional sacrificial layer is configured to be removed in the sacrificial layer etch process, so that the first and second function layers of the wall section are electrically insulated from one another. This makes it possible to define a wall section in the wall of the fluid channel which is used as a heating region or a measuring region.

To keep the influence of the applied currents or voltages on the fluid flow as low as possible, the wall section of the fluid channel wall may be provided with an insulation layer.

BRIEF DESCRIPTION OF THE DRAWINGS

FIG. 1b shows a top view of the flow sensor of FIG. 1a.

DETAILED DESCRIPTION

Figure 1A:
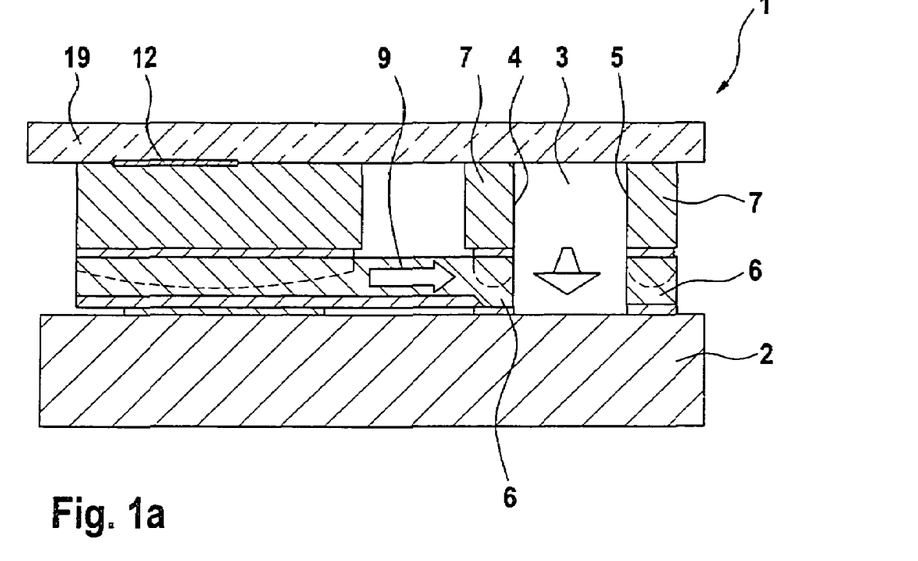
FIG. 1a shows a cross section of a fluid sensor according to a first embodiment of the present invention.
Figure 1B:
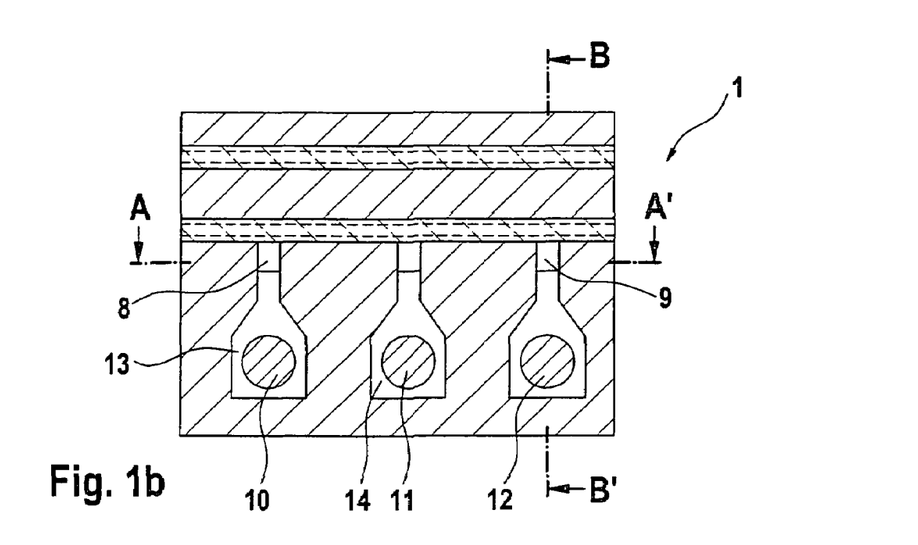

FIG. 1a shows a cross section of a flow sensor according to the present invention. FIG. 1b shows, in a top view, section line B–B' corresponding to the section view of FIG. 1a. Flow sensor 1 is situated on a substrate 2 and has a fluid channel 3, which is situated between a first wall 4 and a second wall 5. First wall 4 and second wall 5 are formed by first function layer 6 and a second function layer 7 applied to first function layer 6. As the top view of FIG. 1b shows, flow sensor 1 has a heating region 8 and a measuring region 9, heating region 8 being situated upstream from the measuring region with respect to the direction of flow in fluid channel 3. The sectional view concerns measuring region 9, which is formed by a region of first function layer 6, which is insulated from substrate 2 by a clearance and in which second function layer 7 has been removed.

The flow sensor illustrated in FIGS. 1a and 1b operates by the heating point method in which, in a first variant, a heat source provided upstream of a fluid flow heats the fluid flow or part of the fluid flow and the temperature increase of the fluid flow is measured using a temperature sensor. The degree of heating depends on the flow velocity of the fluid flow, so that a conclusion regarding the flow velocity may be drawn from the measured temperature of the fluid flow. According to a second variant of the heating point method, the temperature increase measured using the temperature sensor is kept constant, and the heat output required for reaching the temperature which is kept constant is determined. The required heat output is then a function of the fluid flow. The heat source and the temperature sensor may also be thermally coupled in the heating point method, the heat generated in the heat source being dissipated by the fluid flow as a function of its flow velocity, so that a change in temperature which is a function of the heat dissipation occurs at the temperature sensor.

According to a first variant of the measuring method, part of the wall of the fluid channel is heated at a heating point using heating region 8, thus inputting heat into the fluid flow. Due to the flow of the fluid through the fluid channel, the heated fluid flows past measuring region 9 situated downstream, heating the measuring region, which changes the resistance of measuring region 9; this change is detectable via a suitable measuring current or a suitable measuring voltage.

The top view of FIG. 1b shows a first contact surface 10, a second contact surface 11, and a third contact surface 12. Heating region 8 is heated by applying a heating current between first and second contact surfaces 10, 11, and the change in resistance of measuring region 9 is detected by applying a measuring current or a measuring voltage between second and third contact surfaces 11, 12 and measuring the resulting voltage or the resulting current.

The heating current flows via first contact surface 10, which is applied to a contact region 13 in heating region 8. Contact region 13 is a region which is formed by first and second function layers 6, 7 and is connected to heating region 8, which is formed only by the first function layer, in that the first function layer extends through the contact region and through heating region 8. The heating current then flows further through a wall section of the fluid channel to an additional contact region 14, to which second contact surface 11 is applied. A heating current circuit is thus formed, in which the highest voltage drop occurs in heating region 8, because the cross section of the current-conducting first function layer is smaller there than the cross section of the otherwise shared current-conducting first and second function layers 6, 7 of the wall section of fluid channel 3 and contact regions 13, 14.

To further increase the proportion of the voltage drop across heating region 8, second function layer 7 is preferably highly doped to make it highly conductive, and first function layer 6 has minimum doping to increase its resistance.

First and/or second function layer 6, 7 is preferably applied as an epitaxial layer using an epitaxial method. For this purpose, first function layer 6 often has a first start layer on which the epitaxial layer is applied as first function layer 6. Second function layer 7 is applied, also epitaxially, to second start layer 16 applied to first function layer 6. First and second function layers 6, 7 are preferably designed as polycrystalline silicon layers.

After structuring the flow sensor, the flow sensor structure formed on substrate 2 is covered with a flat plate 19, in particular a glass plate to form flow sensor 1.

Figure 2A:
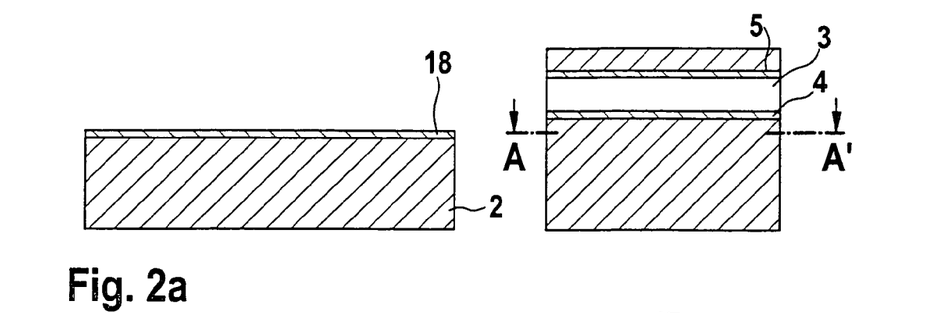
FIG. 2a–e illustrate the manufacturing process of the fluid sensor of FIG. 1.
Figure 2B:
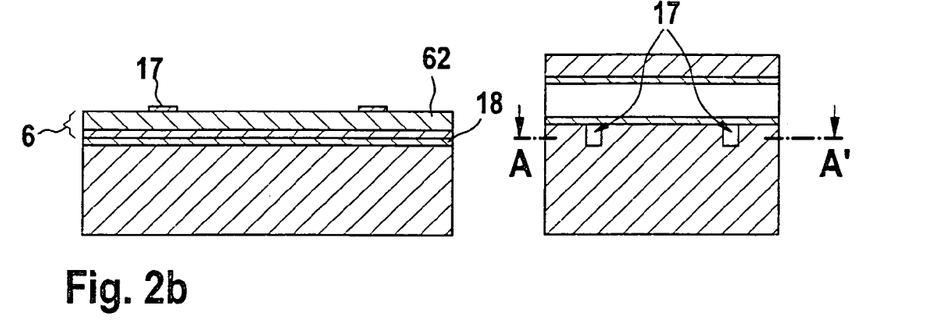

FIGS. 2a–2f show the manufacturing method of such a flow sensor 1. FIG. 2a shows that a sacrificial layer 18 is applied on the entire surface of substrate 2, preferably a silicon substrate, and the sacrificial layer is subsequently structured except for the locations of channel walls 4, 5 of fluid channel 3 to be formed. First function layer 6 is epitaxially applied to the sacrificial layer, preferably using a first start layer 61 and a polycrystalline epitaxial layer 62. An etch stop layer 17 is applied thereto, preferably after planarizing first function layer 6, and structured in such a way that it remains only in heating region 8 and measuring region 9. This is shown in FIG. 2b.

Figure 2C:
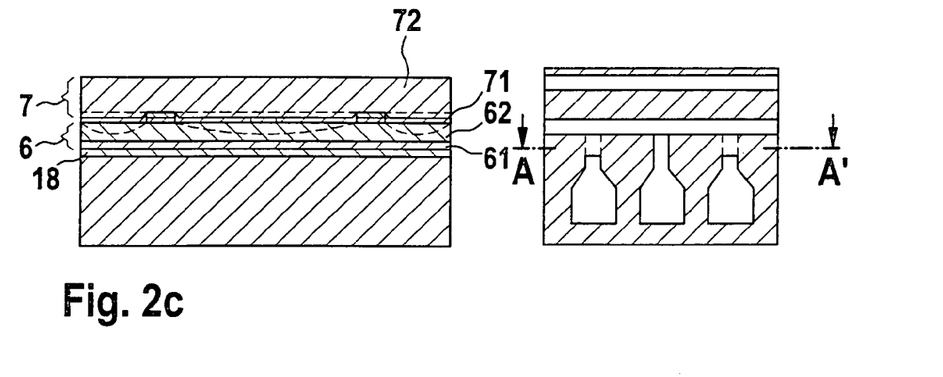

FIG. 2c shows that second function layer 7 is applied superficially using a second start layer 71 and a polycrystalline epitaxial layer 72. To reduce the electrical resistance of the connection between the first function layer and the second function layer, a suitable doping is introduced at least next to the boundary region with first function layer 6; this doping may extend into first function layer 6 by diffusion in a subsequent heating process. Second function layer 7 is metal plated in regions of contact surfaces 10, 11, 12 and then provided with a masking using a resist mask for a subsequent deep etching step to protect contact regions 13, 14 and their applied contact surfaces 10, 11, 12, as well as channel walls 4, 5, against etching attack.

Figure 2D:
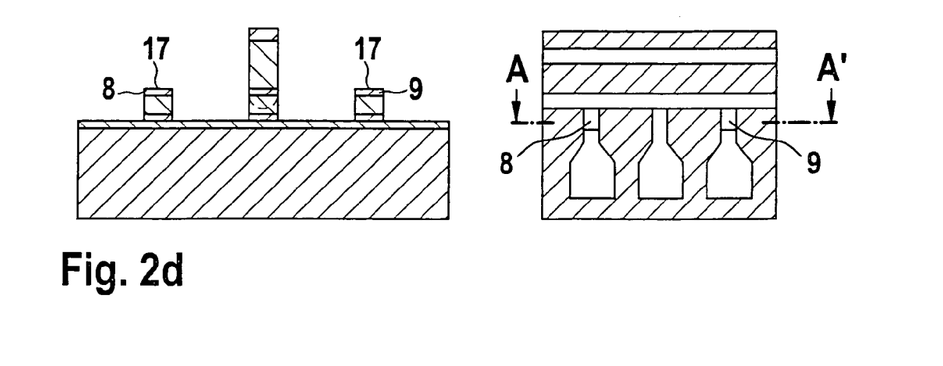

The result of the subsequent deep etch step is shown in FIG. 2d. It is apparent that etch stop layer 17 in the regions not masked by the resist mask and sacrificial layer 18 in the regions not covered by etch stop layer 17 are exposed. It is apparent in the section view along section line A–A' of FIG. 2d that in heating region 8 and measuring region 9 only the first function layer has remained, because it is protected by etch stop layer 17. First function layers 6 may be exposed from the substrate in heating region 8 and measuring region 9 using a subsequent selective etching of sacrificial layer 18, providing electrical and heat insulation with respect to substrate 2 in the form of a clearance.

Figure 2E:
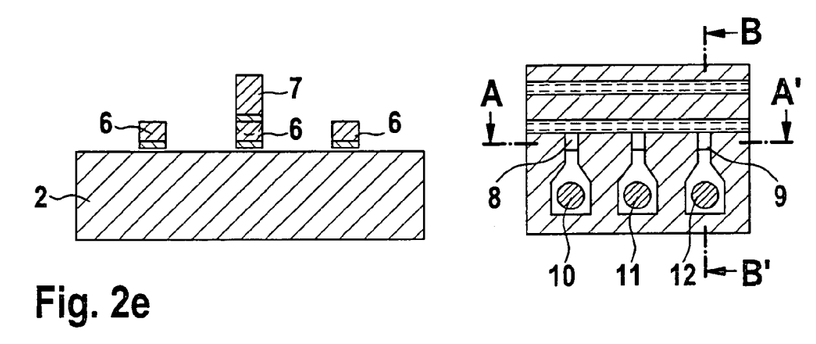

The fluid channel may be sealed by covering the thus obtained structure, thus forming the flow sensor. The flow sensor structure is preferably provided with flat plate 19 made of a suitable glass or the like. In the region of contact surfaces 10, 11, 12, plate 19 preferably has orifices, making the contact surfaces accessible from the outside for contacting.

Figure 3:
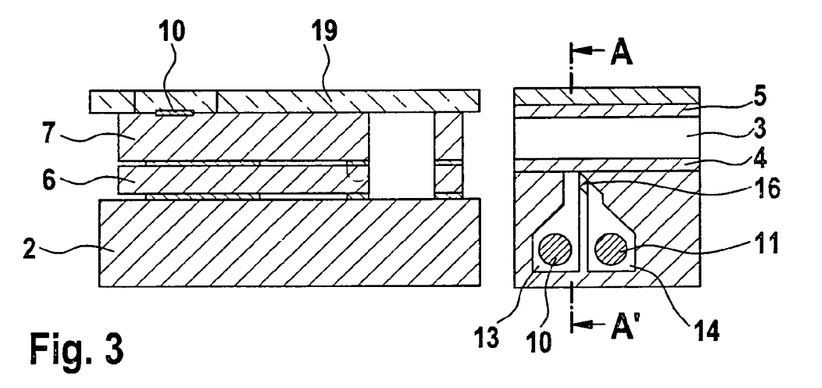
FIG. 3 shows a cross section and a top view of a flow sensor according to another embodiment of the present invention.

FIG. 3 shows a further embodiment of a flow sensor according to the present invention. To keep the current conducted by the wall section as small as possible, contact surfaces for activating heating region 8 and/or measuring region 9 are situated as close to one another as possible; the current is made to exit laterally and is conducted via second function layer 7.

Heat is thus generated only next to the wall in first function layer 6. First function layer 6 is then situated in such a way that it has a laterally offset arm 16 of first function layer 6 extending from contact region 13 and connected to the adjacent additional contact region 14.

Furthermore, current may be supplied via a highly doped layer in substrate 2 or in a further function layer in which an insulated printed conductor may be situated, for example.

Figure 4:
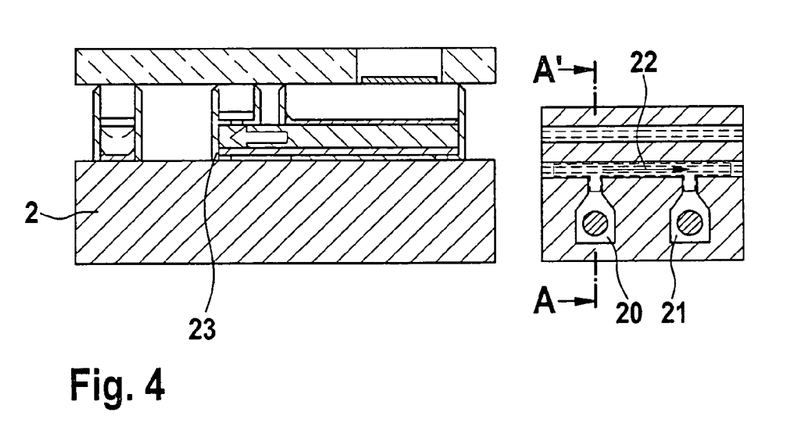
FIG. 4 shows a cross section and a top view of a flow sensor according to an additional embodiment of the present invention.

FIG. 4 shows a further embodiment of a flow sensor according to the present invention, in which a wall section 22 of the fluid channel is situated between two contact regions 20, 21, across which the heating or measuring current is applied. This wall section is used as heating region 8 and/or measuring region 9. Wall section 22 is formed by first and second function layers 6, 7, as in the previous embodiment; however, first function layer 6 has no electrically conductive connection to the substrate, i.e., to second function layer 7. Contact regions 20, 21 are therefore conductively connected only to first function layer 6 in the area of wall section 22. Wall section 22 forms the area of the highest resistance in the current branch between contact regions 20, 21 due to the narrowing of the cross section and/or due to suitable doping, so that the highest voltage drop occurs across wall section 22 in the case of a heating region 8, and heat develops in wall section 22.

If wall section 22 is used as measuring region 9, the change in temperature of the flowing fluid causes a change in resistance, which is noticeable through a changing voltage drop across wall section 22. If first function layer 6 is electrically and thermally insulated in the region of wall section 22 by etching away a sacrificial layer, orifices which the fluid may penetrate are formed in the corresponding band section for fluid channel 3. Therefore, the channel walls of fluid channel 3 must be provided with an insulating layer 23, which seals and electrically insulates fluid channel 3, in particular in the region of wall section 22.

FIGS. 5a–5f show the method for manufacturing a flow sensor according to the embodiment of FIG. 4. A sacrificial layer 31 of a suitable thickness is applied to a substrate 30, e.g., a semiconductor wafer (silicon). Sacrificial layer 31 has silicon dioxide $SiO_2$, for example. Sacrificial layer 31 is used both for the electrical insulation of the contacts from one another, so that the current flows via the channel wall, and for thermal insulation to reduce heat loss into the substrate. Sacrificial layer 31 is structured by removing it in the region of channel walls 4, 5; sacrificial layer 31 remains only in the region of wall section 22 underneath channel wall 5. According to FIG. 5b, a high-resistance first function layer is then applied to this sacrificial layer 31 in the form of a polycrystalline epitaxial layer having a start layer 32 and a polycrystalline epitaxial layer 33. After the application, first function layer 33 may be planarized.

Figure 5A:
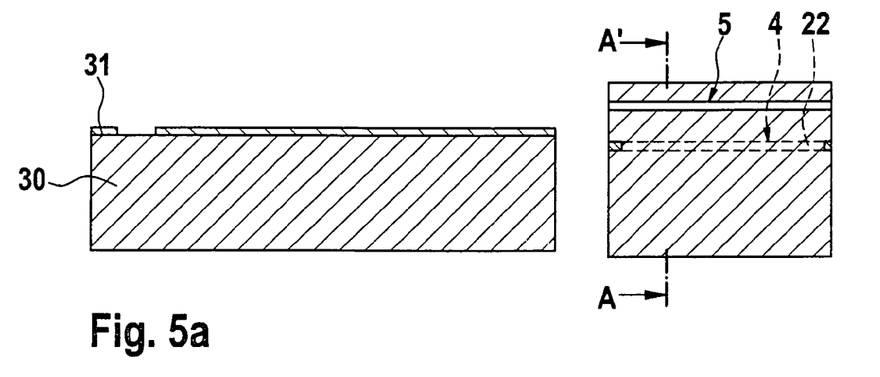
FIG. 5a–f illustrate the manufacturing process of the flow sensor according to the embodiment of FIG. 4.
Figure 5B:
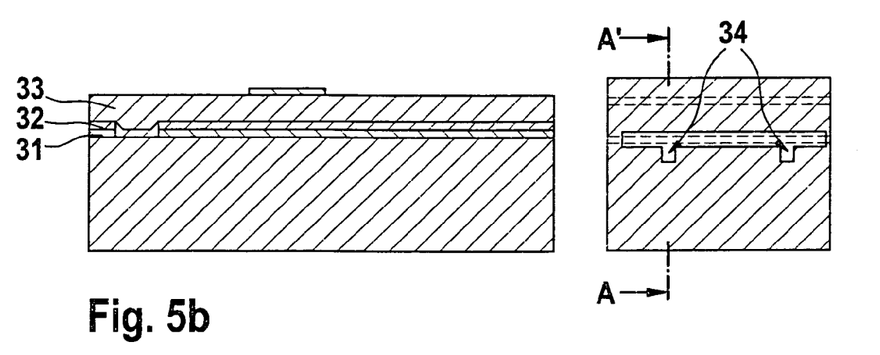

An etch stop layer 34, for example, silicon dioxide, may be applied to first function layer 6 and structured so that the entire resistor area, i.e., heating region 8 or measuring area 9, is covered by etch stop layer 34, which is used for electrically and thermally insulating heating region 8 or measuring region 9 with respect to a second function layer 7 applied thereto, as well as an etch stop layer 34 for supply lead areas.

Figure 5C:
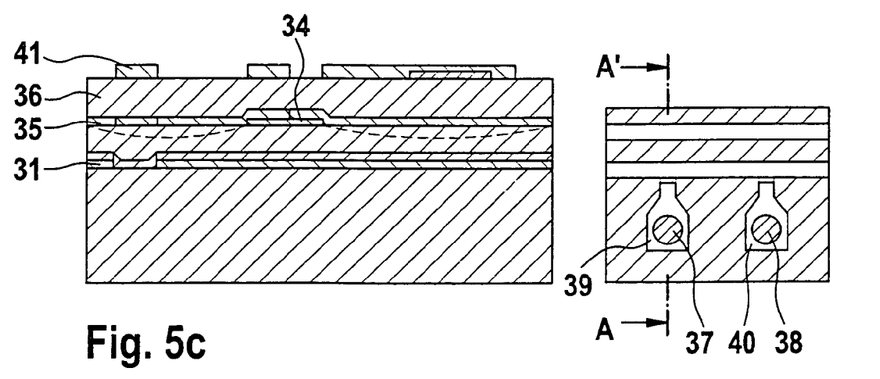

A second function layer 7 is then applied to the thus produced layer structure, also in the form of a polycrystalline epitaxial layer having a second start layer 35 and a second layer 36 made of polycrystalline epitaxial material. Second function layer 7 is doped to make it electrically conductive.

This layer is subsequently metal plated and structured in such a way that contact surfaces 37, 38 are formed on contact regions 39, 40. The future electrical connection to heating region 8 and measuring region 9 may be produced using wire bonding via contact surfaces 37, 38.

A resist mask 41, structured in such a way that contact surfaces 37, 38, contact regions 39, 40, and channel walls 4, 5 are protected against a subsequent deep etch step, is subsequently applied to the entire layer system.

Figure 5D:
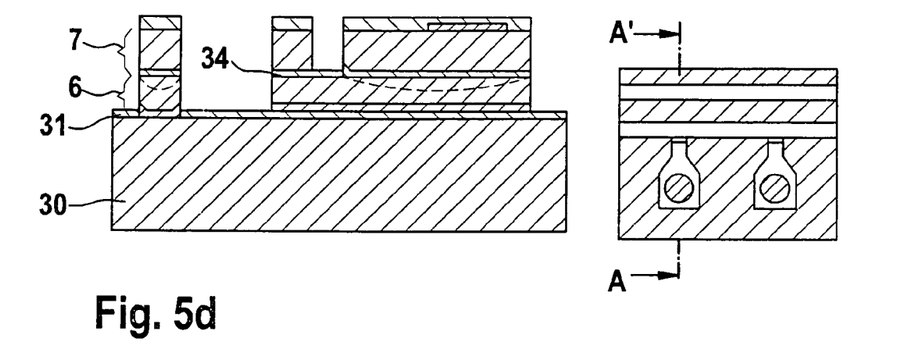
Figure 5E:
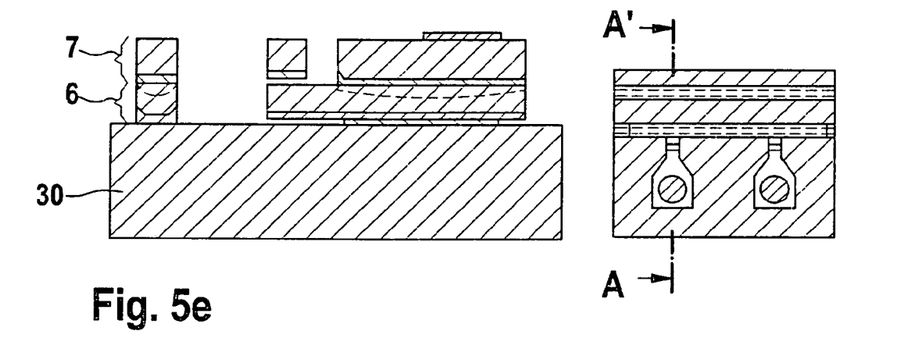

The two function layers 6, 7 are subsequently etched using a suitable etching process, for example, DRIE or the like, leaving the structure of FIG. 5d. The etching process for the two function layers 6, 7 is stopped at sacrificial layer 31 or at etch stop layer 34, both of which are removed by a subsequent sacrificial layer etching method such as gas phase or BOE etching. First function layer 6 in wall section 22 is thus exposed, as shown in FIG. 5e. First and second function layers 6, 7 of wall section 22 are held only by the regions of channel wall 4, whose first and second function layers 6, 7 are not separated by etch stop layer 34 or the sacrificial layer.

Figure 5F:
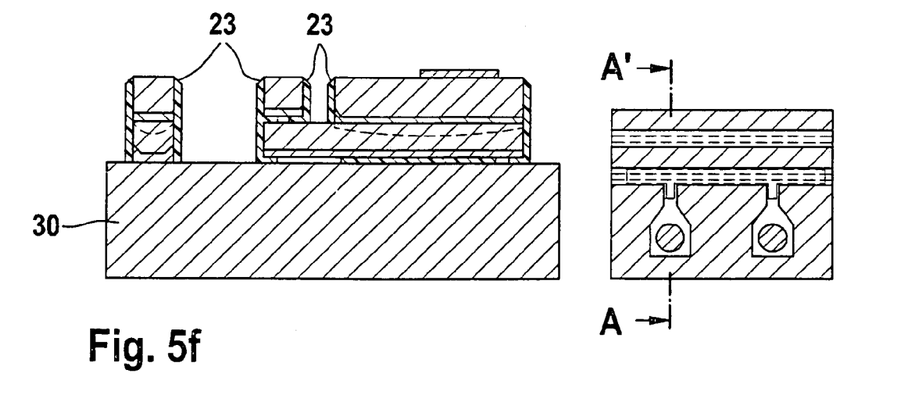

To prevent the fluid from escaping through the orifices thus formed, they must be sealed. For this purpose, an insulation layer 23 is deposited to seal the orifices. In order for insulation layer 23 not to prevent the anodic bonding of plate 19 to seal the flow sensor structure, insulation layer 23 on the top horizontal surfaces may be back-etched again, leaving only the vertical surfaces covered.

The component becomes functional via the subsequent covering of the flow sensor structure (e.g., by anodic bonding to appropriately structured glass, which has contact holes in the region of the contact surfaces), allowing a fluid to be conducted past the lateral flow sensor through the enclosed fluid channel thus formed.

The current is conducted from contact surfaces 37, 38 to the heating resistor or measuring resistor, which is enclosed in the low-doped (high-resistance) first function layer 6 of wall section 22, via highly doped second function layer 7. In contrast to the embodiment of FIG. 1, the voltage does not drop only at a short segment upstream from the channel wall, but across the entire area of wall section 22. In the case of heating region 8, heat is thus generated on a larger surface directly at the fluid. Measuring region 9 also has a larger surface available for measuring the temperature of the fluid, enhancing the sensitivity of the measurement.

Figure 6:
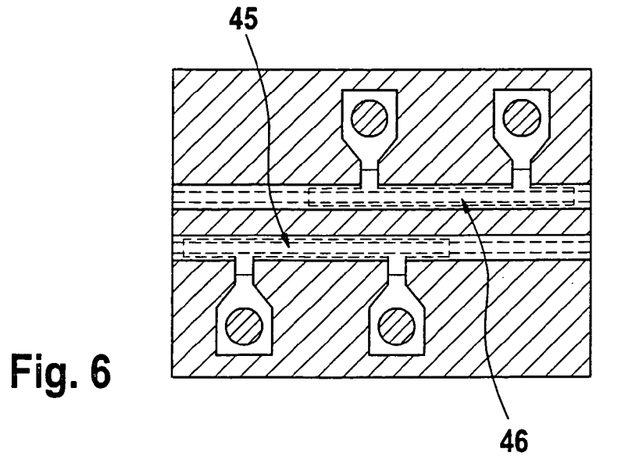
FIG. 6 shows a top view of a flow sensor according to a further embodiment of the present invention.

FIG. 6 shows a heating region 45 and a measuring region 46 on different sides of the fluid channel, the measured change in temperature being a function of the diffusion rate in the fluid across the direction of flow and of the flow velocity of the fluid. The higher the fluid flow velocity, the stronger the measured signal, until ultimately the diffusion rate is not high enough for transporting the heat across the channel. In the case of such a layout, the maximum flow velocity is not to exceed a certain value. The advantage of this system is that no heat is conducted in the wall from the heating region to the measuring region, so that heat transport takes place exclusively in the fluid.

Figure 7:
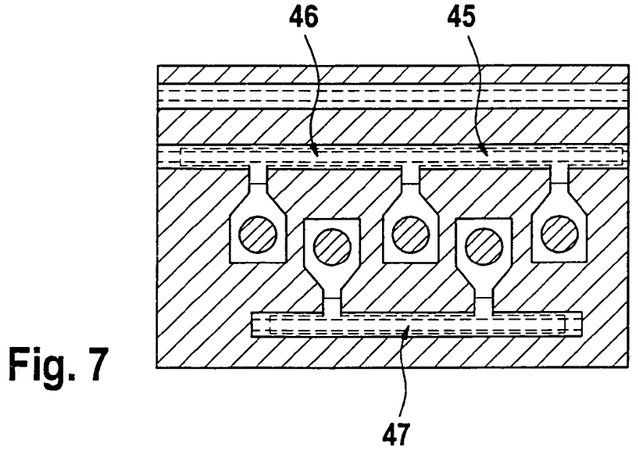
FIG. 7 shows a top view of a flow sensor having reference temperature probes according to a further embodiment of the present invention.

FIG. 7 shows the measuring region and the heating region on the same side of the channel wall. In this embodiment, heat is not transported by the fluid only, but also by the material, i.e., the function layers of the channel wall. Heating region 45 is situated downstream from measuring region 46. The higher the fluid velocity through fluid channel 3, the more heat is transported away by the fluid before it is able to change the measuring resistance due to heat conduction in the wall. The temperature in the measuring region is reduced accordingly. The temperature of the environment may be determined via a reference measuring region 47, which is designed to have the same sensitivity, in particular the same geometric dimensions, as the measuring region. Alternatively, a triple system having two measuring regions and one heating region situated between the two measuring regions may be implemented, the measured values of both measuring regions being evaluated. Fluid flowing in either direction of the fluid channel may thus be detected.

Figure 8:
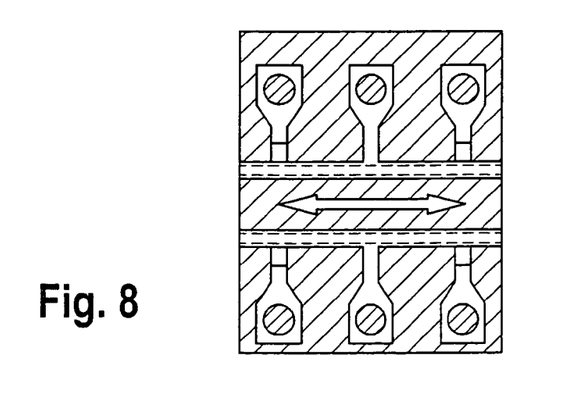
FIG. 8 shows a top view of a flow sensor for fluid flow measurements in two flow directions according to a further embodiment of the present invention.

FIG. 8 shows a further embodiment of the flow sensor according to the present invention, in which the flow sensor structure described in FIG. 1 is also applied to the opposite side of the channel wall, however, in such a way that a fluid flow in the opposite direction is measurable.

LIST OF REFERENCE NUMERALS 1. flow sensor
2. substrate
3. fluid channel
4. channel wall
5. channel wall
6. first function layer
7. second function layer
8. heating region
9. measuring region
10. first contact surface
11. second contact surface
12. third contact surface
13. contact region
14. further contact region
16. laterally offset arm of the first function layer
17. etch stop layer
18. sacrificial layer
19. flat plate
20. contact regions
21. contact regions
22. wall section
23. insulation layer
30. substrate
31. sacrificial layer
32. first start layer
33. first polycrystalline epitaxial layer
34. etch stop layer
35. second start layer
36. second polycrystalline epitaxial layer
37. contact surfaces
38. contact surfaces
39. contact regions
40. contact regions
41. resist mask
61. start layer
62. polycrystalline epitaxial layer
71. start layer
72. polycrystalline epitaxial layer

What is claimed is:

1. An integrated flow sensor for determining a fluid flow, comprising:
    a first function layer;
    a second function layer applied to the first function layer and being electrically connected thereto, wherein:
        a fluid channel is situated in the first function layer and the second function layer to conduct a fluid flow,
        at least one heating region and at least one measuring region are provided adjacent to the fluid channel,
        the first function layer is one of not covered by the second function layer in the at least one heating region and in the at least one measuring region and is insulated from the second function layer,
        one of the first function layer and the second function layer has an increased resistance at least in the at least one heating region,
        the flow sensor can be connected in such a way that the flow sensor at least one of:
            conducts a heating current through one of the first function layer and the second function layer of the at least one heating region, and
            measures a resistance value of one of the first function layer and the second function layer in the at least one measuring region, and
        the fluid flow can be determined as a function of one of the measured resistance value at a constant heat output and a required heat output at a predefined resistance value.

2. The flow sensor as recited in claim 1, wherein the first function layer has a higher specific resistance than the second function layer.

3. The flow sensor as recited in claim 1, wherein the heating current is conducted via a wall of the fluid channel situated on a side of the at least one heating region.

4. The flow sensor as recited in claim 1, wherein the resistance can be measured by measuring a measuring current when a measuring voltage is applied, the measuring current being conducted via a wall of the fluid channel situated on a side of the at least one heating region.

5. The flow sensor as recited in claim 1, further comprising:
   a substrate to which the first function layer is applied, the first function layer being electrically insulated from the substrate in at least one of the at least one heating region and the at least one measuring region.

6. The flow sensor as recited in claim 1, further comprising:
   a substrate to which the first function layer, the first function layer being thermally insulated from the substrate in the at least one heating region.

7. The flow sensor as recited in claim 1, wherein:
   at least one of the at least one heating region and the at least one measuring region is formed by a wall section of the fluid channel,
   the second function layer of the wall section is insulated from a contact region for contacting the first function layer,
   the second function layer of the wall section is insulated from the first function layer, and
   at least one of the at least one heating region and the at least one measuring region is formed by the first function layer of the wall section.

8. The flow sensor as recited in claim 7, wherein at least an inner wall of the wall section of the fluid channel is provided with an insulation layer.

* * * * *

UNITED STATES PATENT AND TRADEMARK OFFICE
CERTIFICATE OF CORRECTION

PATENT NO. : 7,059,186 B2
APPLICATION NO. : 11/020720
DATED : June 13, 2006
INVENTOR(S) : Pinter et al.

Page 1 of 1

It is certified that error appears in the above-identified patent and that said Letters Patent is hereby corrected as shown below:

Column 1, lines 19-20, change "designed as variants heating wire method," to --designed as variants of the heating wire method,--

Column 3, line 30, change "FIG. 2a-e illustrate" to --FIGS. 2a-2e illustrate--

Column 3, line 38, change "FIG. 5a-f illustrate" to --FIGS. 5a-f illustrate--

Column 4, line 66, change "FIGS. 2a-2f show" to --FIGS. 2a-2e show--

Column 9, lines 17-19 change "a substrate to which the first function layer, the first function layer being …" to --a substrate to which the first function layer is applied, the first function layer being …--

Signed and Sealed this

Eleventh Day of March, 2008

JON W. DUDAS
*Director of the United States Patent and Trademark Office*